United States Patent
Ito et al.

(10) Patent No.: US 11,945,027 B2
(45) Date of Patent: Apr. 2, 2024

(54) MOLD POWDER

(71) Applicant: SHINAGAWA REFRACTORIES CO., LTD., Tokyo (JP)

(72) Inventors: Junya Ito, Okayama (JP); Shoji Takahashi, Bizen (JP)

(73) Assignee: SHINAGAWA REFRACTORIES CO., LTD., Tokyo (JP)

( * ) Notice: Subject to any disclaimer, the term of this patent is extended or adjusted under 35 U.S.C. 154(b) by 530 days.

(21) Appl. No.: 17/165,161

(22) Filed: Feb. 2, 2021

(65) Prior Publication Data

US 2021/0252587 A1   Aug. 19, 2021

(30) Foreign Application Priority Data

Feb. 13, 2020  (JP) .................. 2020-022337
Nov. 27, 2020  (JP) .................. 2020-196986

(51) Int. Cl.
*B22D 11/07*   (2006.01)
*C04B 7/14*    (2006.01)
*C04B 14/04*   (2006.01)

(52) U.S. Cl.
CPC ............ *B22D 11/07* (2013.01); *C04B 7/14* (2013.01); *C04B 14/043* (2013.01)

(58) Field of Classification Search
CPC ..... B22D 11/07; B22D 11/108; B22D 11/111; C04B 7/14; C04B 14/043
See application file for complete search history.

(56) References Cited

FOREIGN PATENT DOCUMENTS

| CN | 101406939 | 4/2009 |
|----|-----------|--------|
| JP | 2000-158107 | 6/2000 |
| JP | 2007-167867 | 7/2007 |
| JP | 2007167867 A * | 7/2007 |
| JP | 2012-218042 | 11/2012 |

OTHER PUBLICATIONS

Takahashi et al., "Fluorine Free Mold Powder", Shinagawa Technical Report, vol. 62, 2019, pp. 1-6.

* cited by examiner

*Primary Examiner* — Anthony M Liang
*Assistant Examiner* — Jacob J Gusewelle
(74) *Attorney, Agent, or Firm* — Wenderoth, Lind & Ponack, L.L.P.

(57) ABSTRACT

In the mold powder, the content of F is 0.5% by mass or less (including 0% by mass), CaO and $SiO_2$ are included as main components, the mass ratio of CaO to $SiO_2$ ($CaO/SiO_2$) is 0.6 to 1.4, the content of $B_2O_3$ is 0.3 to 2.8% by mass, the content of $Na_2O$ is 5.0 to 20.0% by mass, the total content of $Li_2O$ and $K_2O$ is 0 to 4.0% by mass, the content of MgO is 0 to 3.5% by mass, the content of $Al_2O_3$ is 1.0 to 8.0% by mass, and the content of MnO is 1.0% by mass or less (including 0% by mass).

3 Claims, No Drawings

MOLD POWDER

This application is based upon and claims the benefit of priority to Japanese Patent Application No. 2020-022337 filed on Feb. 13, 2020 and Japanese Patent Application No. 2020-196986 filed on Nov. 27, 2020, the entire contents of which are incorporated herein by reference.

BACKGROUND

The present disclosure relates to a mold powder suitable for continuous casting of steel.

In the continuous casting process of steel, a mold powder is placed on the surface of the molten steel in the mold. The mold powder receives heat from the molten steel and melts to cover the surface of the molten steel (hereinafter, the mold powder in the molten state is referred to as "powder slag"). The powder slag flows into the gap between the mold and the solidified shell to form a slag film, which is then discharged from the lower end of the mold and consumed. The main roles of the mold powder in this process are (1) keeping the molten steel temperature, (2) preventing oxidation of the molten steel by shutting off the air, (3) cleaning the molten steel by capturing non-metallic inclusions that emerge from the molten steel, (4) lubricating between the solidified shell and the mold, and (5) adjusting heat removal from the solidified shell to the mold, etc.

For steel grades with high crack susceptibility, reduction of heat removal, that is, a gradual cooling effect is particularly emphasized, and the mold powder, in which Cuspidine ($3CaO, 2SiO_2, CaF_2$) having a large effect is crystallized in a slag film, is widely used. However, Cuspidine contains F, and when it reacts with cooling water, HF is generated, which may cause corrosion of equipment and adverse effects on the environment. Therefore, JP-A-2012-218042 and JP-A-2007-167867 disclose a mold powder in which $Na_2O \cdot 2CaO \cdot 3SiO_2$, which have a gradual cooling effect even without containing F, are crystallized in a slag film.

However, in the mold powders disclosed in JP-A-2012-218042 and JP-A-2007-167867, calcium silicate-based crystals (e.g., compounds whose basic composition consists of CaO and $SiO_2$, such as $CaO \cdot SiO_2$ and $2CaO \cdot SiO_2$) having a high melting point easily crystallizes in the slag film. In particular, Na is consumed in the crystallized portion of the main crystal ($Na_2O \cdot 2CaO \cdot 3SiO_2$), and calcium silicate-based crystals are likely to be crystallized in the remaining portion, so that the crystal phase tends to be non-uniform. As a result, a problem of the slag film is that the lubricity and the uniformity of the gradual cooling effect deteriorate, and the operational stability and the steel quality are easily impaired.

DESCRIPTION OF EXEMPLARY EMBODIMENTS

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

The present disclosure has been made in view of the above-referenced circumstances, and an object of some aspects of the present disclosure is to provide mold powders that enable stable continuous casting of high-quality steel by suppressing the crystallization of calcium silicate-based crystals, which tend to impair operational stability and steel quality, while crystals having a gradual cooling effect are crystallized even without containing F.

(1) One aspect of the present disclosure relates to a mold powder, wherein the content of F is 0.5% by mass or less (including 0% by mass), CaO and $SiO_2$ are included as main components, the mass ratio of CaO to $SiO_2$ ($CaO/SiO_2$) is 0.6 to 1.4, the content of $B_2O_3$ is 0.3 to 2.8% by mass, the content of $Na_2O$ is 5.0 to 20.0% by mass, the total content of $Li_2O$ and $K_2O$ is 0 to 4.0% by mass, the content of MgO is 0 to 3.5% by mass, the content of $Al_2O_3$ is 1.0 to 8.0% by mass, and the content of MnO is 1.0% by mass or less (including 0% by mass).

By reducing the content of F to 0.5% or less and optimizing the content of $Na_2O$, crystals composed of $Na_2O$, CaO and $SiO_2$ are stably crystallized in the slag film while crystallization of calcium silicate-based crystals having a high melting point is suppressed. Furthermore, by optimizing the content of $B_2O_3$, the crystallization of calcium silicate-based crystals is suppressed. The reason is not clear, but it is conceivable that $B_2O_3$ forms a network in the slag film to promote vitrification. Since the crystals composed of $Na_2O$, CaO and $SiO_2$ have a gradual cooling effect, it is possible to give a uniform gradual cooling effect to the slag film without impairing the lubricity, and stable continuous casting for high quality steel is possible.

(2) In one aspect of the present disclosure, it is preferable that the viscosity at 1300° C. is 0.1 to 1.0 Pa·s and the crystallization temperature is 950° C. to 1230° C. As a result, the entrainment defects of the powder slag are suppressed, and the inflow of the powder slag is maintained appropriately. In addition, the gradual cooling effect is promoted, and cracks on the surface of the slab and fluctuations in thermocouple temperature are prevented. Furthermore, breakout due to breakage of the solidified shell is suppressed. As a result, continuous casting operation is maintained stable and the quality of steel can be improved.

(3) In one aspect of the present disclosure, the crystals crystallized in the slag film preferably include one or two or more of crystals composed of $aNa_2O_4 \cdot bCaO \cdot cSiO_2$ (where a, b, and c are any integers from 1 to 8), and more preferably does not include calcium silicate-based crystals. Crystals composed of $Na_2O$, CaO and $SiO_2$ are stably crystallized in the slag film, while the crystallization of calcium silicate-based crystals having a high melting point is suppressed, so that a uniform gradual cooling effect can be given to the slag film without impairing lubricity.

Exemplary embodiments are described below. Note that the following exemplary embodiments do not in any way limit the scope of the content defined by the claims laid out herein. Note also that all of the elements described in the present embodiment should not necessarily be taken as essential elements In the mold powder of the present embodiment, the content of F is 0.5% by mass or less (including 0% by mass), CaO and $SiO_2$ are included as main components, the mass ratio of CaO to $SiO_2$ ($CaO/SiO_2$) is 0.6 to 1.4, the content of $B_2O_3$ is 0.3 to 2.8% by mass, the content of $Na_2O$ is 5.0 to 20.0% by mass, the total content of $Li_2O$ and $K_2O$ is 0 to 4.0% by mass, the content of MgO is 0 to 3.5% by mass, the content of $Al_2O_3$ is 1.0 to 8.0% by mass, and the content of MnO is 1.0% by mass or less (including 0% by mass).

[F]

The content of F is 0.5% by mass or less, and more preferably 0.3% by mass or less (including 0% by mass) including those caused by unavoidable impurities. As a result, crystallization of crystals composed of $Na_2O$, CaO and $SiO_2$ in the slag film is promoted, and the crystallization of Cuspidine is suppressed, so that the corrosion of equipment and the adverse effect on the environment due to F are suppressed.

[CaO, $SiO_2$]

The mold powder includes CaO and $SiO_2$ as main components. The mass ratio of CaO to $SiO_2$ ($CaO/SiO_2$) is preferably 0.6 to 1.4, and more preferably 0.7 to 1.3. When the mass ratio ($CaO/SiO_2$) is 0.6 or more, crystallization of crystals composed of $Na_2O$, CaO and $SiO_2$ in the slag film is promoted, and a high gradual cooling effect is obtained. On the other hand, when the mass ratio ($CaO/SiO_2$) is 1.4 or less, crystallization of calcium silicate-based crystals having a high melting point such as Di-calcium silicate and Gehlenite is suppressed.

The raw material of the main component is not particularly limited as long as it is generally used for a mold powder, and some $CaO$—$SiO_2$ base materials or some silica raw materials can be used. The $CaO$—$SiO_2$ base material includes, for example, fly ash, Portland cement, synthetic calcium silicate, Wollastonite, calcium carbonate, blast furnace slag, phosphorus slag, Di-calcium silicate, limestone, and quicklime. Silica raw material includes, for example, silica sand, diatomaceous earth, glass powder, feldspar, silica stone, perlite, silica fume, silica flower, fly ash and the like. These raw materials are blended to adjust the mass ratio ($CaO/SiO_2$).

[$B_2O_3$]

The content of $B_2O_3$ is 0.3 to 2.8% by mass, more preferably 0.5 to 2.7% by mass, and even more preferably 1.6 to 2.6% by mass. When the content of $R_2O_3$ is 0.3% by mass or more, the crystallization of calcium silicate-based crystals having a high melting point in the slag film is suppressed, and the lubricity and the uniformity of the gradual cooling effect are appropriately maintained. The reason why the crystallization of calcium silicate-based crystals is suppressed is not clear, but it is conceivable that $B_2O_3$ forms a network in the slag film to promote vitrification. On the other hand, when the content of $B_2O_3$ is 2.8% by mass or less, the change in steel characteristics due to diffusion into molten steel is suppressed. In addition, the surface tension of the powder slag is maintained at an appropriately high level, and entrainment defects of the powder slag can be suppressed. When the content of $B_2O_3$ is excessive, the vitrification of the slag film is promoted, and a sufficient gradual cooling effect is not obtained. The $B_2O_3$ raw material includes borax, Colemanite, Calciborite, premelted synthetic slag and the like.

[$Na_2O$]

The content of $Na_2O$ is preferably 5.0 to 20.0% by mass, more preferably 6.0 to 18.0% by mass, and even more preferably 8.0 to 15.0% by mass. When the content of $Na_2O$ is 5.0% by mass or more, crystallization of crystals composed of $Na_2O$, CaO and $SiO_2$ is promoted, and a high gradual cooling effect is obtained. On the other hand, when the content of $Na_2O$ is 20.0% by mass or less, the viscosity of the powder slag is appropriately maintained, and the entrainment defects of the powder slag and the melting damage of the immersion nozzle are suppressed. Furthermore, since the crystallization temperature is appropriately maintained, crystallization of one or two or more of crystals composed of $aNa_2O \cdot bCaO \cdot cSiO_2$ (where a, b, and c are any integers from 1 to 8) in the slag film is promoted, and high degree of gradual cooling effect is obtained.

[$Li_2O$, $K_2O$]

When high inflow performance is required for powder slag due to high-speed casting or the like, $Li_2O$ or $K_2O$ of alkali metal oxides other than $Na_2O$ may be added, but the total content is 0 to 4.0% by mass, and preferably 0 to 3.0% by mass. When the total content is 4.0% by mass or less, the viscosity and surface tension of the powder slag are appropriately maintained, and the entrainment defects of the powder slag are suppressed.

[MgO]

The content of MgO is preferably 0 to 3.5% by mass, and more preferably 0 to 3.0% by mass. When the content of MgO is 3.5% by mass or less, crystallization of MgO-containing crystals is suppressed. In addition, the formation of spinel due to the reaction with $Al_2O_3$ in the steel is suppressed, and the absorption capacity of the inclusions in the steel is appropriately maintained.

[$Al_2O_3$]

The content of $Al_2O_3$ is preferably 1.0 to 8.0% by mass, more preferably 3.6 to 8.0% by mass, even more preferably 4.1 to 7.9% by mass, and particularly preferably 5.0 to 7.0% by mass. When the content of $Al_2O_3$ is 3.6% by mass or more, the fluctuation of the heat flux from the molten steel to the mold becomes extremely small, and the uniform cooling property of the slab is improved. When the content of $Al_2O_3$ is 8.0% by mass or less, the crystallization of Gehlenite having a high melting point is suppressed, and the crystallization of crystals composed of $Na_2O$, CaO and $SiO_2$ is promoted, so that the melting property and the uniformity of the gradual cooling effect are appropriately maintained.

[MnO]

MnO is likely to be contained as an unavoidable impurity, but the content is preferably 1.0% by mass or less, and more preferably 0.5% by mass or less (including 0% by mass). When the content of MnO is 1.0% by mass or less, the reduction reaction with the molten steel is suppressed, and the Mn drop into the molten steel is suppressed. In addition, the oxygen supply to the molten steel due to the reduction reaction is suppressed, and the surface tension of the molten steel is appropriately maintained.

[Carbon]

Carbon may be added to adjust the slagging rate of the mold powder. The content of carbon is preferably 10% by mass or less (including 0% by mass). As a result, carbon pickup to molten steel is suppressed. The carbon raw material includes graphite, carbon black coke powder and the like.

[Other Components]

As other components, fluxes may be added to adjust the softening point, viscosity and crystallization temperature. As the flux, carbonates such as sodium carbonate, lithium carbonate and magnesium carbonate can be used. A small amount of $Fe_2O_3$, $TiO_2$, $Cr_2O_3$, $P_2O_5$, S and the like may be included as unavoidable impurities.

[Viscosity]

The viscosity of the mold powder (powder slag) at 1300° C. is preferably 0.1 to 1.0 Pa·s, and more preferably 0.1 to 0.8 Pa·s. When the viscosity is 0.1 Pa·s or more, the entrainment defects of the powder slag are suppressed, and when the viscosity is 1.0 Pa·s or less, the inflow of the powder slag is appropriately maintained.

[Crystallization Temperature]

The crystallization temperature of the mold powder is preferably 950 to 1230° C., and more preferably 970 to 1200° C. When the crystallization temperature is 950° C. or higher, crystallization is promoted and the gradual cooling effect is also promoted, so that cracks on the surface of the slab and fluctuations in the thermocouple temperature (temperature indicated by the thermocouple embedded in the mold) are suppressed. Since the thickness of the crystal layer is appropriately maintained when the crystallization temperature is 1230° C. or lower, the inflow of powder slag is appropriately maintained, and breakout due to breakage of the solidified shell is suppressed.

[Crystal]

The crystals crystallized in the slag film include one or two or more of crystals composed of $aNa_2O \cdot bCaO \cdot cSiO_2$ (where a, b, and c are any integers from 1 to 8), preferably three or less, more preferably one, and preferably do not include calcium silicate-based crystals. Crystals composed of $Na_2O$, CaO and $SiO_2$ are stably crystallized in the slag film, while the crystallization of calcium silicate-based crystals having a high melting point is suppressed, so that a uniform gradual cooling effect can be given to the slag film without impairing lubricity.

[Form of Mold Powder]

The raw material of the mold powder is not particularly limited as long as it is generally used for the mold powder including the above-mentioned ones and satisfies the above composition and characteristics. The form of the mold powder is not particularly limited as long as it is a form generally used for the mold powder, and includes, for example, fine powder, extruded granules, hollow spray granules, agglomerated granules and the like.

Hereinafter, Examples of the present disclosure will be described in detail.

[Experimental Method]

A mold powder was placed on the surface of the molten steel in the mold and continuous casting was performed. All tests were performed in a continuous casting facility using a slab mold. Table 1 shows the steel grades and the compositions of the mold powders used in the experiment. The steel grade "LC" indicates a low carbon steel having a carbon concentration in steel of 0.01 to 0.07% by mass, and "ULC" indicates an ultra low carbon steel having a carbon concentration in steel of less than 0.01% by mass. The unit of composition is % by mass, but the mass ratio ($CaO/SiO_2$) is the mass ratio of CaO to $SiO_2$, and is shown in parentheses to distinguish it from other % by mass indications. The columns hatched in gray mean that the numbers do not meet the scope of this disclosure.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Steel Grade | | LC | ULC | LC | LC | LC | ULC | LC | LC | LC | LC |
| Composition (% by mass) | F | 0.1 | 0.0 | 0.0 | 0.2 | 0.0 | 0.0 | 0.0 | 0.0 | 0.0 | 0.0 |
| | CaO | 25.3 | 39.0 | 37.0 | 24.7 | 28.7 | 24.1 | 30.7 | 30.7 | 30.1 | 29.1 |
| | $SiO_2$ | 41.1 | 27.9 | 36.5 | 27.4 | 34.2 | 39.7 | 32.2 | 36.5 | 35.7 | 34.7 |
| | Mass Ratio ($CaO/SiO_2$) | (0.62) | (1.40) | (1.01) | (0.90) | (0.84) | (0.61) | (0.95) | (0.84) | (0.84) | (0.84) |
| | $B_2O_3$ | 2.6 | 2.4 | 2.4 | 2.1 | 0.5 | 2.7 | 1.5 | 0.5 | 0.5 | 0.5 |
| | $Na_2O$ | 13.4 | 9.2 | 5.4 | 19.7 | 11.0 | 12.9 | 11.9 | 11.0 | 11.0 | 11.0 |
| | $K_2O + Li_2O$ | 0.8 | 0.6 | 0.7 | 0.7 | 2.2 | 0.0 | 0.3 | 2.2 | 2.2 | 2.2 |
| | MgO | 1.8 | 3.2 | 3.0 | 3.4 | 0.7 | 1.8 | 2.6 | 0.7 | 0.7 | 0.7 |
| | $Al_2O_3$ | 1.5 | 4.1 | 4.1 | 3.1 | 7.9 | 7.2 | 1.0 | 3.6 | 5.0 | 7.0 |
| | MnO | 0.0 | 0.1 | 0.0 | 0.0 | 0.0 | 0.0 | 0.0 | 0.0 | 0.0 | 0.0 |

| | | Comparative Examples | | | | | | | | |
|---|---|---|---|---|---|---|---|---|---|---|
| | | 1 | 2 | 3 | 4 | 5 | 6 | 7 | 8 | 9 |
| Steel Grade | | ULC | LC | LC | LC | LC | LC | LC | LC | LC |
| Composition (% by mass) | F | 2.0 | 0.0 | 0.0 | 0.0 | 0.0 | 0.0 | 0.0 | 0.0 | 0 |
| | CaO | 26.9 | 21.6 | 33.9 | 27.3 | 37.0 | 34.3 | 36.4 | 18.2 | 36.5 |
| | $SiO_2$ | 38.3 | 41.2 | 22.4 | 39.6 | 36.1 | 29.5 | 40.0 | 28.3 | 36.6 |
| | Mass Ratio ($CaO/SiO_2$) | (0.70) | (0.52) | (1.51) | (0.69) | (1.02) | (1.16) | (0.91) | (0.64) | (1.00) |
| | $B_2O_3$ | 2.5 | 2.5 | 2.4 | 0.0 | 3.0 | 6.0 | 2.0 | 1.9 | 1.5 |
| | $Na_2O$ | 12.5 | 13.9 | 15.0 | 21.0 | 5.4 | 7.3 | 4.2 | 24.1 | 5.4 |
| | $K_2O + Li_2O$ | 0.8 | 0.8 | 0.8 | 0.0 | 0.7 | 0.4 | 1.7 | 0.6 | 0.8 |
| | MgO | 2.3 | 3.4 | 5.4 | 0.7 | 3.0 | 2.0 | 2.3 | 1.7 | 3.0 |
| | $Al_2O_3$ | 3.3 | 2.1 | 4.1 | 2.9 | 4.1 | 9.3 | 3.1 | 5.3 | 4.1 |
| | MnO | 0.0 | 0.1 | 0.2 | 0.0 | 0.1 | 0.0 | 0.0 | 0.0 | 1.5 |

Examples 1 to 10 are Examples of the present disclosure. Comparative Example 1 has a large content of F. Comparative Example 2 has a small mass ratio ($CaO/SiO_2$) and Comparative Example 3 has a large mass ratio ($CaO/SiO_2$) and a large content of MgO. Comparative Example 4 has a low content of $B_2O_3$, which is 0% by mass, Comparative Example 5 has a high content of $B_2O_3$, and Comparative Example 6 has a high content of $B_2O_3$ and $Al_2O_3$. Comparative Example 7 has a low content of $Na_2O$ and Comparative Example 8 has a high content of $Na_2O$. Comparative Example 9 has a high content of MnO.

The following evaluations of the mold powders of Examples and Comparative Examples were made.

[Viscosity]

The viscosity of the mold powder was measured by the ball pulling method. That is, the viscosity was determined from the load when a platinum ball having a diameter of 10 mm was suspended in a powder slag at 1300° C. and pulled up at a speed of 0.85 cm/s.

[Crystallization Temperature]

The crystallization temperature of the mold powder was measured by the differential thermal method. That is, after heating and melting about 150 g of the mold powder, the temperature of the powder slag was measured while decreasing the temperature at 4° C./min, and the temperature at the start of exothermic by crystallization was defined as the crystallization temperature.

[Crystal]

The crystals crystallized in the slag film were measured by the X-ray diffraction method. Among the detected crystals, those composed of $Na_2O$, $CaO$ or $SiO_2$ and their abbreviations are shown in Table 2.

TABLE 2

| Crystal | Abbreviation |
|---|---|
| $Na_2O \cdot 3CaO \cdot 2SiO_2$ | $NC_3S_2$ |
| $Na_2O \cdot 2CaO \cdot 3SiO_2$ | $NC_2S_3$ |
| $Na_2O \cdot CaO \cdot SiO_2$ | NCS |
| $2Na_2O \cdot CaO \cdot 3SiO_2$ | $N_2CS_3$ |
| $2Na_2O \cdot 3CaO \cdot 2SiO_2$ | $N_2C_3S_2$ | of the powder slag and inclusions. The sliver defect was rated as excellent (⊚) if the incidence was less than 1%, good (○) if the incidence was 1% or more and less than 3%, fair (Δ) if the incidence was 3% or more and less than 6%, and unacceptable (×) if the incidence was 6% or more.

[Slab Cracking]

The slab was hot-rolled and the slab cracking was rated as excellent (⊚) if the rate of degradation due to cracking developed was less than 1%, good (○) if the rate was 1% or more and less than 3%, fair (Δ) if the rate was 3% or more and 4% or less, and unacceptable (×) if the rate was greater than 4%.

[Operational Stability]

The thermocouple temperature was monitored and the operational stability was rated as excellent (⊚) if the thermocouple temperature was almost constant and the operation was stable, good (○) if the thermocouple temperature fluctuated slightly but did not interfere with the operation, and unacceptable (×) if the thermocouple temperature fluctuated greatly and interfered with the operation due to lack of lubrication of the powder slag.

[Evaluation Results]

Table 3 shows the evaluation results of Examples and Comparative Examples.

TABLE 3

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Characteristics | Viscosity (Pa·s) | 0.48 | 0.19 | 0.51 | 0.12 | 0.40 | 0.80 | 0.30 | 0.18 | 0.23 | 0.34 |
| | Crystallization Temperature (° C.) | 1090 | 1100 | 1020 | 1160 | 970 | 980 | 1200 | 1060 | 1030 | 985 |
| | Crystal | $NC_3S_2$ | $NC_3S_2$ | $NC_3S_2$ | $NC_2S_3$ $NC_3S_2$ NCS | $NC_2S_3$ NCS | $NC_2S_3$ | $NC_2S_3$ NCS | $NC_2S_3$ | $NC_2S_3$ NCS | $NC_2S_3$ NCS |
| Evaluation | Sliver Defect | ○ | ○ | ○ | ⊚ | ⊚ | ○ | ○ | ○ | ○ | ⊚ |
| | Slab Cracking | ⊚ | ⊚ | ○ | ⊚ | ○ | ○ | ⊚ | ⊚ | ⊚ | ⊚ |
| | Operational Stability | ⊚ | ⊚ | ⊚ | ○ | ⊚ | ⊚ | ○ | ○ | ⊚ | ⊚ |

| | | Comparative Examples | | | | | | | | |
|---|---|---|---|---|---|---|---|---|---|---|
| | | 1 | 2 | 3 | 4 | 5 | 6 | 7 | 8 | 9 |
| Characteristics | Viscosity (Pa·s) | 0.36 | 0.58 | 0.09 | 0.33 | 0.46 | 0.32 | 0.57 | 0.08 | 0.43 |
| | Crystallization Temperature (° C.) | 1020 | 945 | 1280 | 1190 | 1010 | — | 1250 | 1070 | 1040 |
| | Crystal | $NC_3S_2$ Cuspidine | $N_2CS_3$ | $NC_3S_2$ $C_2S$ | $NC_3S_2$ CS | $NC_3S_2$ | — | $C_2S$ | $N_2C_3S_2$ | $NC_3S_2$ |
| Evaluation | Sliver Defect | ○ | ○ | — | ○ | X | X | Δ | X | X |
| | Slab Cracking | ○ | X | — | X | ○ | ○ | Δ | Δ | ○ |
| | Operational Stability | X | X | X | X | ⊚ | X | X | ○ | ○ |

TABLE 2-continued

| Crystal | Abbreviation |
|---|---|
| $CaO \cdot SiO_2$ | CS |
| $2CaO \cdot SiO_2$ | $C_2S$ |

[Sliver Defect]

The incidence of a sliver defect, which is a linear scratch, was determined for cold-rolled coils after rolling the slab. A lower the incidence of a sliver defect means less entrainment In all of Examples 1 to 10, stable continuous casting was achieved, and a steel quality equivalent to that of the conventional product when the F-containing mold powder was used was secured. In terms of operational stability, Examples 2 to 3, 5 to 6, and 8 to 10 having an $Al_2O_3$ content of 3.6% by mass or more are excellent, Examples 2 to 3, 5 to 6, and 9 to 10 having an $Al_2O_3$ content of 4.1 to 7.9% by mass were superior, and Examples 9 to 10 having an $Al_2O_3$ content of 5.0 to 7.0% by mass were particularly excellent. This is presumably because the moderate presence of $Al_2O_3$ suppressed the crystallization of calcium silicate-based crystals in the remaining portion of the crystallized portion of the main crystals ($Na_2O \cdot 2CaO \cdot 3SiO_2$), making the crystal phase homogeneous, and the fluctuation of heat flux from the molten steel to the mold was extremely small, improving the uniformity of the gradual cooling effect.

In Comparative Example 1, the thermocouple temperature fluctuated and operational stability was unacceptable. In addition, the content of F was high, and Cuspidine was crystallized. In Comparative Example 2, slab cracking occurred, the thermocouple temperature fluctuated, and operational stability was unacceptable. This is presumably because the mass ratio ($CaO/SiO_2$) was small, the crystallization temperature was lowered, the crystals were difficult to crystallize, and a sufficient gradual cooling effect was not obtained. In Comparative Example 3, the thermocouple temperature fluctuated, and operational stability was unacceptable. This is presumably because the mass ratio ($CaO/SiO_2$) was large, $C_2S$ having a high melting point was crystallized, the crystal phase became non-uniform, and the lubrication property of the slag film and the uniformity of the gradual cooling effect deteriorated. In Comparative Example 4, the thermocouple temperature fluctuated and operational stability was unacceptable. This is presumably because CS having a high melting point was crystallized and the lubricity of the slag film and the uniformity of the gradual cooling effect deteriorated. In Comparative Example 5, the operational stability was good, but the sliver defect deteriorated. This is presumably because the content of $B_2O_3$ was high. In Comparative Example 6, the thermocouple temperature fluctuated, and operational stability was unacceptable. In addition, no crystals were detected. This is presumably because the excess $B_2O_3$ promoted vitrification and a sufficient gradual cooling effect was not obtained. In Comparative Example 7, the thermocouple temperature fluctuated, and operational stability was unacceptable. This is presumably because the content of $Na_2O$ was low, so that $C_2S$ having a high melting point was crystallized, and the lubricity of the slag film and the uniformity of the gradual cooling effect deteriorated. In Comparative Example 8, the sliver defect was unacceptable. This is presumably because the content of $Na_2O$ was high, the viscosity of the powder slag was lowered, and the entrainment defects of the powder slag occurred. In Comparative Example 9, the sliver defect was unacceptable. The content of MnO was high, and it is considered that a reduction reaction with molten steel and a drop into the molten steel occurred.

While the present embodiment has been described in detail as described above, those skilled in the art will be able to easily understand that many variations that do not substantially deviate from the new matters and effects of the present disclosure are possible. Therefore, all such variations are within the scope of the present disclosure. For example, a term that is mentioned at least once in the specification with a different term that is broader or synonymous may be replaced by that different term anywhere in the specification.

What is claimed is:

1. A mold powder, wherein
   a content of F is 0 to 0.5% by mass,
   CaO and $SiO_2$ are included as main components, and a mass ratio of CaO to $SiO_2$ ($CaO/SiO_2$) is 0.6 to 1.4,
   a content of $B_2O_3$ is 0.3 to 2.8% by mass, a content of $Na_2O$ is 5.0 to 20.0% by mass, a total content of $Li_2O$ and $K_2O$ is 0 to 4.0% by mass, a content of MgO is 0 to 3.5% by mass, a content of $Al_2O_3$ is 1.0 to 8.0% by mass, and a content of MnO is 0 to 1.0% by mass.

2. The mold powder according to claim 1, wherein a viscosity at 1300° C. is 0.1 to 1.0 Pa·s and a crystallization temperature is 950° C. to 1230° C.

3. The mold powder according to claim 1, wherein a crystal crystallized in the slag film includes one or two or more of crystals composed of $aNa_2O \cdot bCaO \cdot cSiO_2$, wherein a, b, and c are any integers from 1 to 8.

* * * * *